INVENTOR.
GAYLORD W. BROWN
MELVIN OTTO Jr.
BY

INVENTOR.
GAYLORD W. BROWN
MELVIN OTTO Jr.

United States Patent Office 3,504,403
Patented Apr. 7, 1970

3,504,403
DIFFERENTIAL PRESSURE PLASTIC FORMING MACHINE PARTIBLE MOLD MECHANISM FOR FORMING ARTICLES IN A PLASTIC SHEET
Gaylord W. Brown, Beaverton, and Melvin Otto, Jr., Gladwin, Mich., assignors to Brown Machine Company of Michigan, Inc., Beaverton, Mich., a corporation of Michigan
Filed Mar. 20, 1967, Ser. No. 624,508
Int. Cl. B29c *17/00*
U.S. Cl. 18—19                    20 Claims

ABSTRACT OF THE DISCLOSURE

A differential pressure thermoforming machine having a female mold member mounted for movement toward and away from a deformable plastic sheet; sockets in the mold member to receive a plurality of partible die segments which when in closed mated position have radial walls forming a closed end to thereby provide a closed end cavity in each socket; support means pivotally mounting the radial walls of the die segments and thereby mounting the die segments for swinging movements radially outwardly to an expanded position in which the part formed by be readily removed from each closed end cavity; means mounting the die segments for axial travel inwardly and outwardly in the sockets; and spaced apart, axially tapered rings in the sockets automatically swinging the segments to closed mated position when the die segments move axially into the sockets.

---

This inventon relates to machines for forming articles such as containers in thermoplastic, synthetic plastic sheets and more particularly to partible or segmental mold mechanism which is suitable for thermoforming containers having portions of increased girth between their ends.

One of the prime objects of the invention is to provide simple and reliable partible mold mechanism, capable of differential pressure forming diversely shaped containers in a deformable plastic sheet, which is operable automatically to move from closed to open position to release the parts formed when the female mold mechanism is withdrawn from the plastic sheet after formation of the parts therein.

A further object of the invention is to provide a differential pressure thermoforming machine having opposed molds movable toward and away from a plastic web wherein the particle mold segments operate to strip the web after the articles are formed therein.

Other objects and advantages of the invention will be pointed out specifically or will become apparent from the following description when it is considered in conjunction with the appended claims and the accompanying drawings, in which:

Figure 1:
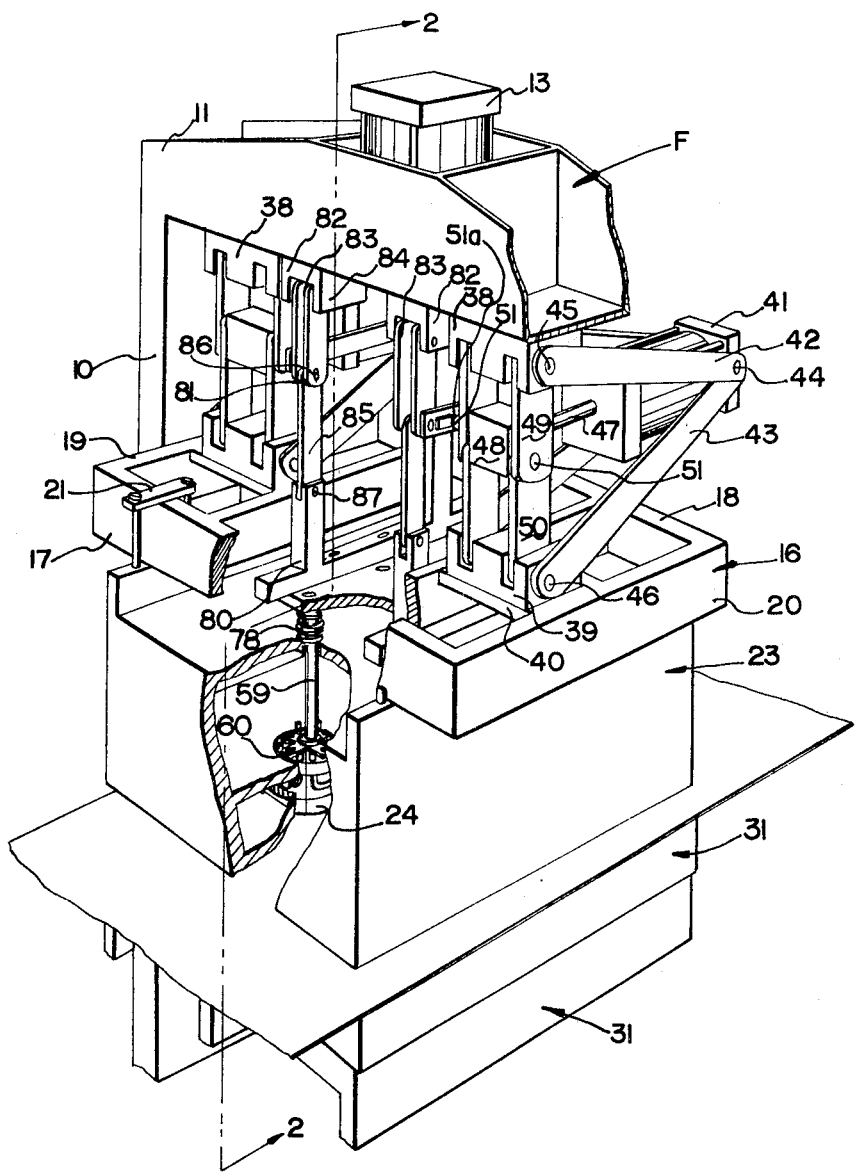
FIGURE 1 is a fragmentary, partly sectional, perspective, elevational view of a differential pressure forming machine which incorporates the invention.

Referring now more particularly to the accompanying drawings, wherein is shown differential pressure forming apparatus of the nature of the machine shown in the present assignee's copending application Ser. No. 293,959, entitled Differential Pressure Forming Machine, and the present assignee's copending application Ser. No. 573,916, entitled Stripper Actuating Mechanism for Differential Pressure Forming Machines, a letter F generally designates the frame of the machine, which is shown as having side members 10 connected to the upper channel member 11. Mounted in fixed position on the upper frame 11 is a double-acting, fluid pressure operated cylinder 13 having a piston rod 14 (see FIGURE 2) which is coupled at its lower end, as at 15, to an upper platen frame generally designated 16. As shown, the platen frame member 16 may comprise end members 17 and 18 connected by side members 19 and 20. The members 17 and 18 are also braced by intermediate cross members 21 and 22. Mounted on the platen frame 16 is a female mold box assembly generally designated 23 which includes partible female mold or die members 24 which are supported in a manner which will be presently described.

Figures 2, 6, 7:
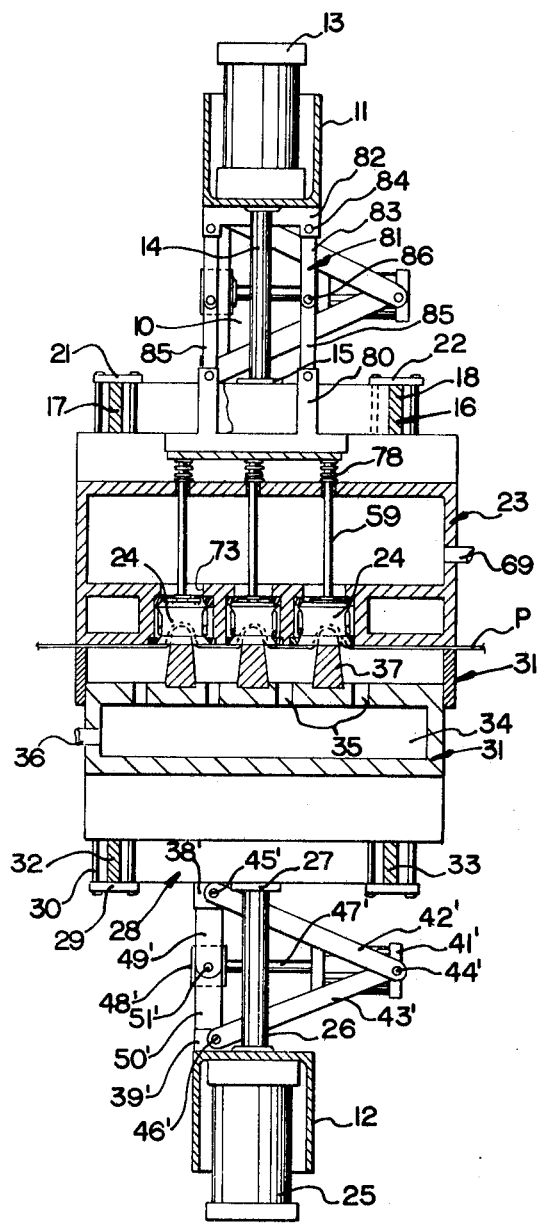
FIGURE 2 is a transverse sectional elevational view taken on the line 2—2 of FIGURE 1.
FIGURE 6 is a fragmentary sectional elevational view showing the partible mold supporting links when the partible molds are engaging the plastic sheet.
FIGURE 7 is a similar view illustrating another position of the same links.
Figure 3:
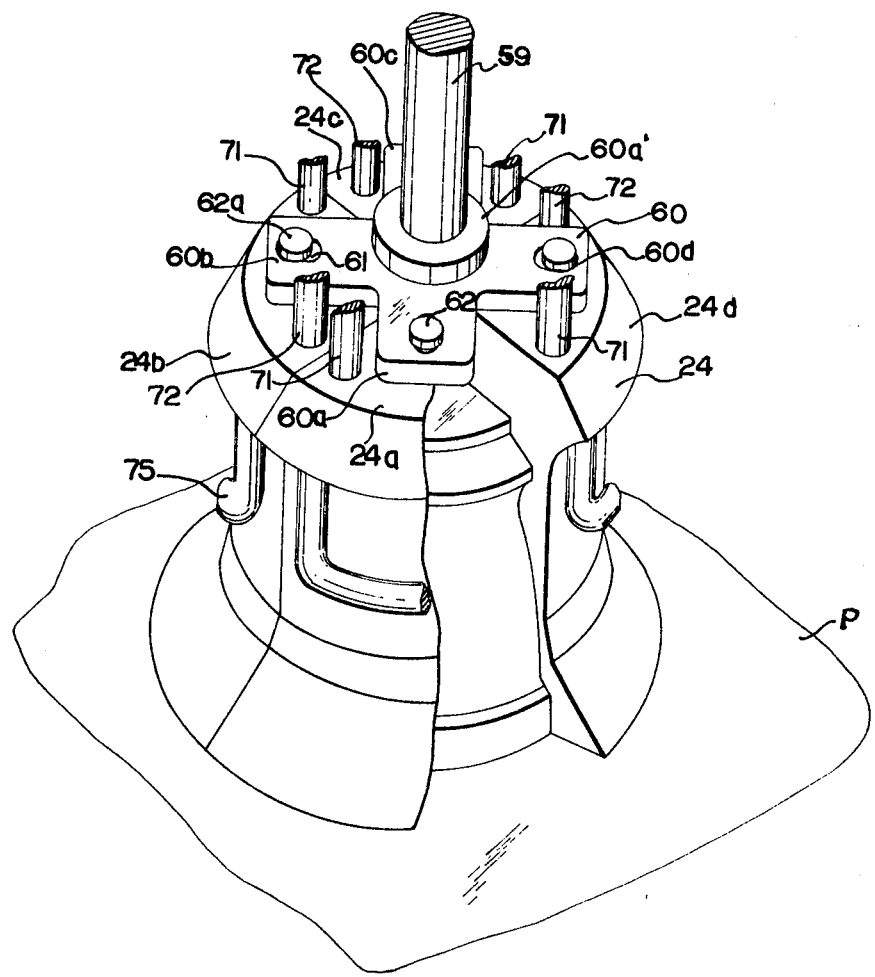
FIGURE 3 is a greatly enlarged, fragmentary, perspective, elevational view of one of the segmental cavity forming dies or molds which are incorporated in the upper mold assembly.

The frame portion 12, shown in FIGURE 2, similarly supports a double-acting, fluid pressure operated cylinder 25 having a piston rod 26 which is coupled as at 27 to a lower platen assembly generally designated 28 which, as shown, may be formed similarly to the upper platen assembly 23. Clamp 29 secured by bolts 30, similar to those which secure the upper platen 16 to assembly 23. clamp a hollow male mold box assembly generally designated 31 to the end rails 32 and 33 of the lower platen assembly 28. As FIGURE 2 particularly indicates, the lower platen assembly 28 includes an air manifold or air box 34 having ports 35 therein which assist in the forming operation in the manner described in the aforementioned copending applications. An air line 36 may be provided in communication with a suitable source of air under pressure to provide air to the box 34 at the proper time. Also mounted by the air box 34 in vertical alignment with the female mold members 24 are plug assist members 37 which, in the usual manner, are employed to initially deform the heated plastic web P and facilitate its entry into the female mold members 24.

As in the aforementioned application, the forming machine illustrated employs toggle linkage systems for locking the upper and lower mold box assemblies 23 and 34 in molding or forming position and exerting a preloading stress thereon urging the mold assemblies 23 and 34 in a direction toward the plastic sheet P during the molding operation. Mounted on the upper frame member 11 are support blocks 38 in vertical alignment with support blocks 39 mounted on cross braces 40 provided on the upper platen assembly 20. A double-acting, fluid pressure operated cylinder 41 at each end of the upper platen 16 is supported at its outer end between the blocks 38 and 39 by pairs of straddling toggle links 42 and 43 which pivotally connect to the cylinder 41 at their converging ends at 44 and are pivotally connected to the blocks 38 and 39, respectively, by pins 45 and 46. The piston rod 47 of each cylinder 41 connects with a block 48, and each block 48 is pivotally connected to toggle links 49 and 50 by a pivot pin 51. The lower platen assembly includes identical linkage mechanism and identical parts have been given the same numerals except that the numerals have been primed, and these parts accordingly need not and will not be independently described.

Figure 4:
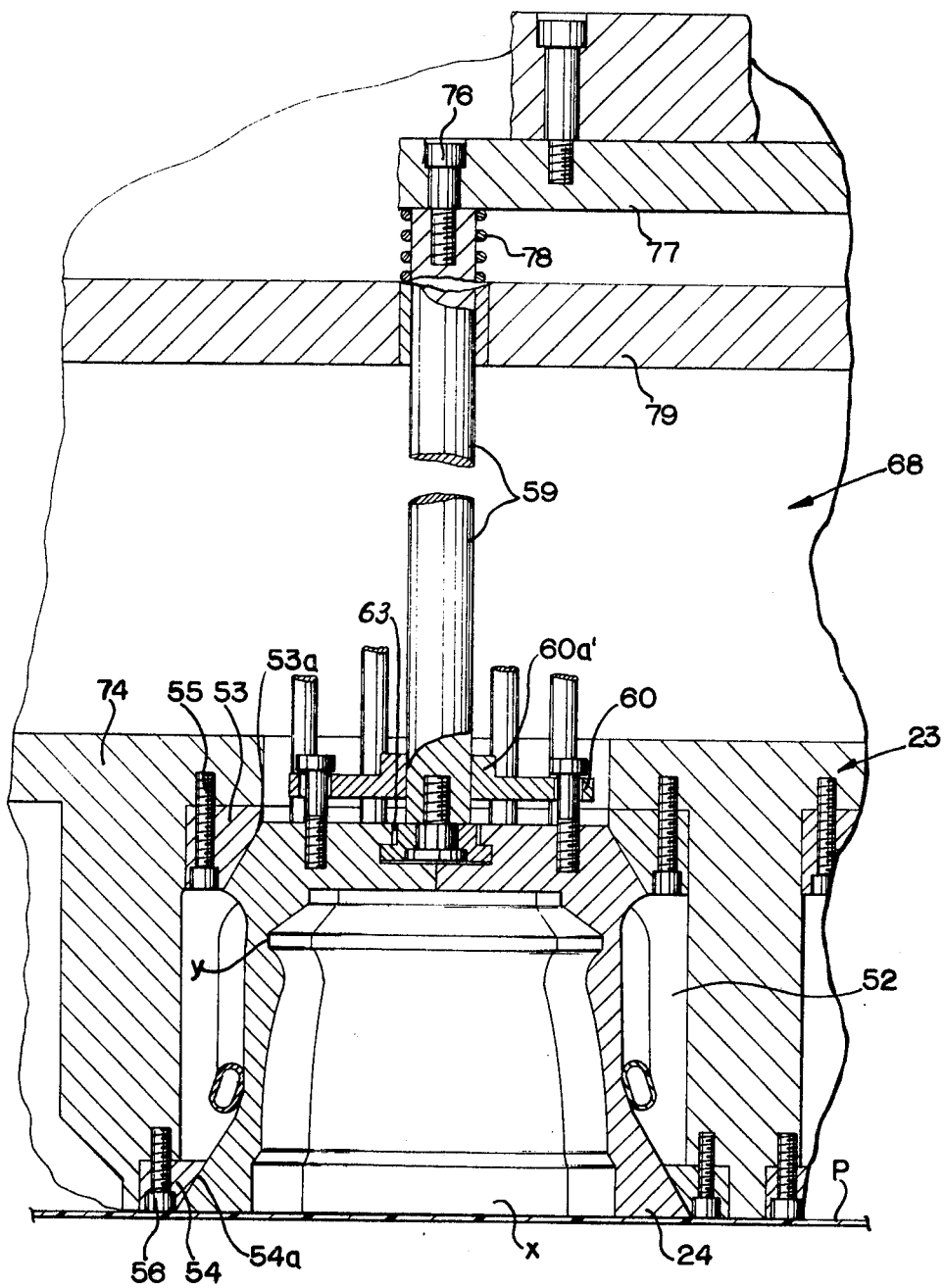
FIGURE 4 is a framentary, sectional, elevational view of the upper mold assembly on an enlarged scale, with the mold being shown engaging the plastic web ready for the container forming operation.
Figure 5:
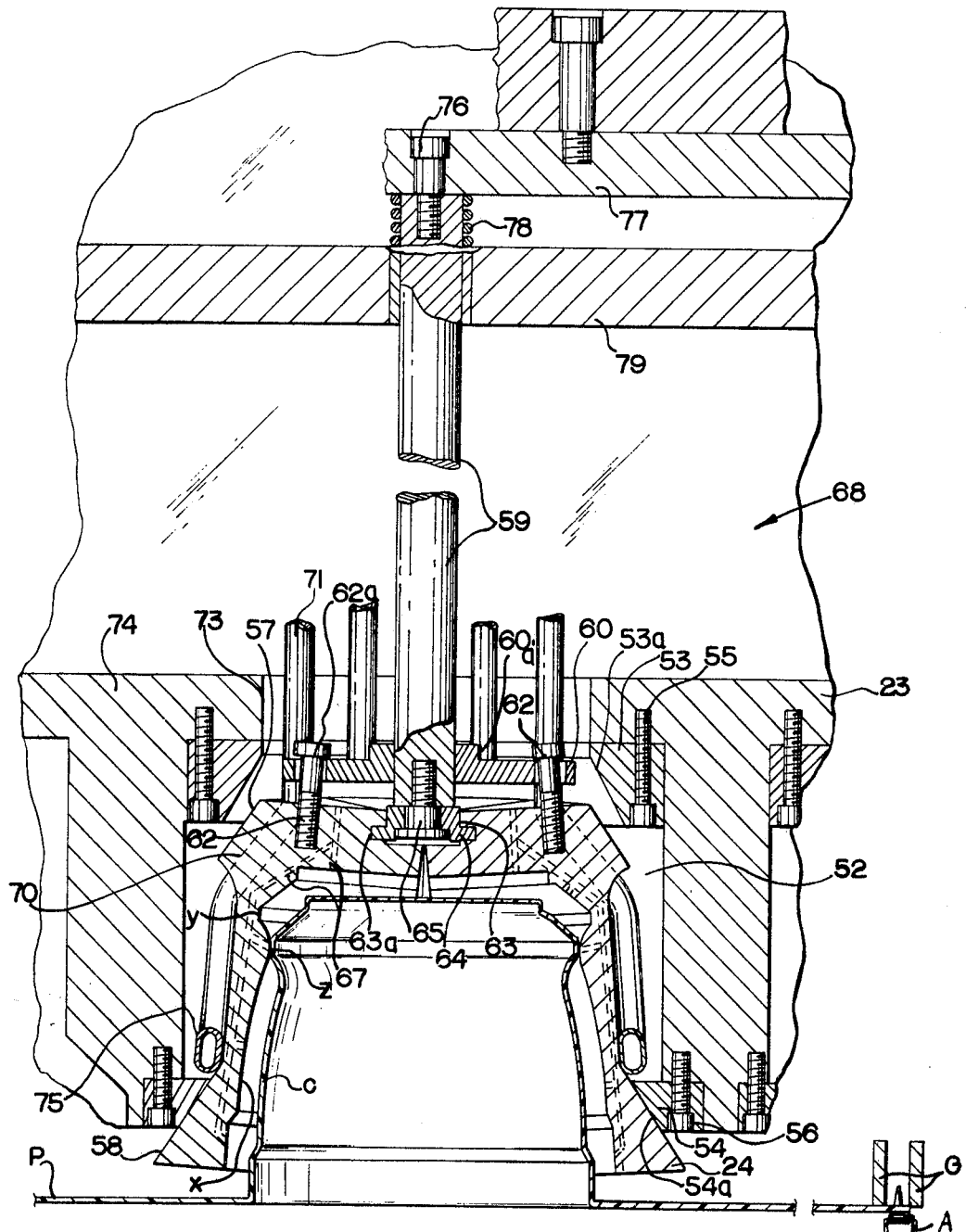
FIGURE 5 is a similar view with the upper mold assembly being shown in retracted position and illustrating the manner in which the partible mold releases a part formed in the plastic sheet.

As FIGURES 4 and 5 indicate, each bell-shaped segmental mold 24 is mounted by the upper mold assembly 23 within annular recesses or sockets 52, and spaced apart upper and lower ring members 53 and 54 are respectively bolted, as at 55 and 56, in position in each socket 52 around each partible mold 24. Each of the rings 53 annd 54 includes an inwardly and upwardly tapering surface 53a and 54a, respectively, for a purpose which will presently be apparent, to cooperate with similarly inclined surfaces 57 and 58, respectively, provided on the four mating mold segments respectively designated 24a, 24b, 24c and 24d. When in closed position as shown in FIGURE 4, the segments 24a–24d provide a forming cavity x with a portion y between its ends and it is only because the die segments 24a–24d are partible, as demonstrated in FIGURE 5, that a container C formed with a portion z of increased girth may be removed from the cavity x.

Each mold 24 is supported by a rod or shaft 59 which mounts a spider member 60 having a collar 60a' which is fixed to the shaft 59, the spider 60 having leg portions 60a, 60b, 60c and 60d with radially elongate slotted openings 61 provided therein to receive pins 62 which are anchored in each of the mold segments 24a–24d and have heads 62a of greater diameter than the width of slots 61. At their inner ends each of the mold segments 24a–24d are recessed as at 63 (see FIGURE 5) and include slot portions 63a to receive a retainer collar 64 which is bolted to the shaft 59 as at 65. In this way, the mold segments 24a–24d are mounted centrally on the shaft 59 but, as FIGURE 5 indicates, may be pivoted radially outwardly about their central connection to the retainer collar 64 because the pins 62 are permitted to move radially within the confines of slots 61. In the closed position in which they are shown in FIGURE 4, the mold segments 24a–24d permit the formation of a container such as at C having an outwardly bulging wall projection z as shown in FIGURE 5.

As in the machines illustrated in the aforementioned applications, suction forces are employed to draw the heated, deformable plastic sheet P into intimate contact with each mold cavity x formed by a set of mold or die sections 24a–24d, and vacuum ports such as shown at 67 which communicate with the vacuum manifold 68 provided in the upper mold assembly 23 may be employed as shown in FIGURES 4 and 5. As FIGURE 2 indicates, a flexible hose member 69 may connect with the vacuum manifold 68 to communicate a vacuum pump with the mold cavity x at the appropriate time in the forming operation. It is also essential that the metal mold segments 24a–24d be cooled and, to accomplish this, each of the segments is provided with a pair of bored openings 70 which snugly accommodate an inlet coolant tube or pipe section 71 and an outlet coolant tube or pipe section 72. For each of the segments 24a–24d then, an inlet pipe portion 71 extends through an opening 73 provided in a wall 74 of the upper mold assembly 23 and extends through an opening 70 and down along the exterior wall of the mold segment. It is then connected with the upwardly extending outlet pipe portion 72 by a lateral connection portion 75, the portion 72 also extending upwardly in surface contact with the mold segment and through bore 70 therein out through the opening 73. It is to be understood that the line portions 71 may be connected with a source of circulating coolant, such as water, and that the line portions 72 may connect to a drain. It may, of course, be desirable to connect the water supply and return line portions 71 and 72 to a recirculating apparatus such as shown in the present assignee's United States Patent No. 2,994,514.

The shafts 59 which support each segmental mold 24 are connected by bolts 76 to a plate 77, and coil springs 78 are provided on each shaft 59 between the plate 77 and the cover plate 79 of the upper mold assembly 23.

The plate 77 is carried by linkage mechanism of the character disclosed in the aforementioned pending application Ser. No. 573,916, which may comprise support frame members 80 which are suspended by means of toggle linkages generally indicated at 81 from support block members 82 which are fixed to the upper frame channel member 11. Each linkage 81 includes at its upper end a pair of links 83 which at their upper ends are connected by a pin 84 to one of the support blocks 82 and also includes a link 85 which is connected between links 83 by a pivot pin 86 and is connected at its lower end to the members 80 by a pivot pin 87.

As in the aforementioned application Ser. No. 573,916, the end 51a of toggle linkage pin 51 at one side of the machine extends inwardly into the path of a pair of spaced apart blocks 88 and 88a provided on a cross bar 89 which connects the front and rear sets of toggle links 83 and 85.

In operation, and when the upper and lower mold assemblies 23 and 31 are withdrawn from the plastic sheet P, the toggle links 83 and 85 are in the position in which they are shown in FIGURE 7. Then when a heated, deformable plastic sheet P is indexed to a position between the mold assemblies 23 and 31, cylinders 13 and 41 are operated in the first place to respectively move the platen 20 downwardly and expand links 49 and 50 from a contracted buckled position to the position in which they are shown in FIGURES 1 and 2. In this position the links 49 and 50 are in vertical alignment and the pin 51 is "on dead center" to lock mold 23 in a position in which a preloading force is exerted on the platen 20 urging it in a direction toward the plastic sheet P. This is the position in which the parts appear in FIGURE 4 and the mold segments 24a–24d are in the compressed position with the surfaces 57 and 58 in engagement with the surfaces 53a and 54a, respectively. To move the molds 24 as well as the sockets 52 into engagement with sheet P, the pin end 51a, while the mold assembly 23 is moving downwardly, moves from the position shown in FIGURE 7 to the position shown in FIGURE 6 and operates to expand links 83 and 85 to the vertically aligned position shown in FIGURE 1. In this position of the parts, the springs 78, as shown in FIGURE 4, are not compressed or only partially compressed.

The cylinders 25 and 41' are then operated to move the lower mold assembly 31 upwardly to respectively engage the plastic sheet P and expand the links 49' and 50' until the pins 51' are "on dead center" and the linkage locks the mold assembly 31 in "up" position with a preloading force which urges the mold assembly 31 in a direction toward the plastic sheet P. The air pressure through line 36 and suction via line 69 are then applied in the manner fully described in the previously mentioned applications to move the portions of the plastic sheet P distended by the plug assists 37 into intimate engagement with the cavities x of the molds 24.

Thereafter, cylinders 13 and 41 are operated to respectively withdraw the mold assembly 23 and buckle the links 49 and 50. Initially, the pin end 51a simply moves in the space between abutment blocks 88 and 88a from the position shown in FIGURE 6 toward a position in which the pin end 51a engages the abutment block 88a, and during this time the molds 24 act as strippers and remain in engagement with the plastic web P as the sockets 52 move upwardly. At this time the mold segments 24a–24d are free of rings 53 and 54 and free to radially expand. When the pin end 51a does contact the abutment 88a and buckles the links 83 and 85 so that the pins 86 move out of "dead center" position, the compressed springs 78 are free to move the mold segments 24a–24d upwardly into the sockets 52 as the upper mold assembly continues to rise and at this time, as shown in FIGURE 5, the bulged portions z of each container C formed "cams" the mold segments 24a–24d outwardly to permit them to clear the container C and withdraw past the bulged portion z thereof. In FIGURE 5 the mold segments 24a–24d are shown in the process of being moved back into the sockets 52. The spring 78 expands from the contracted position shown in FIGURE 5 to bring mold segments 24a–24d into engagement with rings 53 and 54 and thereby close the female mold segments.

The cylinders 25 and 41' are also operated at about this time to respectively withdraw the mold assembly 31 and buckle the links 49' and 50'. In machines of this type the plastic sheet P is conveyed to a position between the upper and lower mold assemblies by the usual advancing chain mechanism A described in application Ser. No. 293,959 and plastic sheet edge guides G may be employed to prevent the sheet P from moving upwardly when the segmental molds 24 are snapped upwardly.

It is to be understood that the drawings and descriptive matter are in all cases to be interpreted as merely illustrative of the principles of the invention rather than as limiting the same in any way, since it is contemplated that various changes may be made in the various elements to achieve like results without departing from the spirit of the invention or the scope of the appended claims.

I claim:

1. A differential pressure forming machine particularly for forming articles such as containers with portions of increased girth intermediate their ends in a thermoplastic, synthetic plastic sheet comprising: female mold assembly means; means for introducing a heated deformable sheet of plastic to said mold assembly means; means for relatively moving one of said introducing means and mold assembly means to bring said mold assembly means into engagement with said sheet; socket means on said mold assembly means; partible female mold segments received in said socket means; means mounting said segments and socket means for relative axial travel; means mounting said segments for radial movement from a closed mated position in which they form a mold cavity for forming an article such as a container to a radially expanded position; means for creating a differential forming pressure on opposite sides of said plastic sheet; cooperating means on said socket means and mold segments for moving said segments to closed positions when the socket means and mold segments are moved relatively axially, and means for moving said mold assembly means and mold segments relatively axially to permit said segments to spread to a position in which they can release a container formed therein; said mold assembly means including a spider means having radially extending slots; each of said segments having mounting means mounted for pivotal movement in said slots.

2. The combination defined in claim 1 in which said spider means is mounted on an actuator rod supported for axial movement in said mold assembly means; and axially spaced apart, mating, tapered surfaces on said socket means and segments cooperate to pivot said segments to closed position.

3. A differential pressure forming machine particularly for forming articles such as containers with portions of increased girth intermediate their ends in a thermoplastic, synthetic plastic sheet comprising: female mold assembly means; means for introducing a heated deformable sheet of plastic to said mold assembly means; motor means for relatively moving one of said introducing means and mold assembly means for moving said mold assembly means toward and away from said plastic sheet; socket means on said mold assembly means having a surface flush with said mold segments in one relative position of said socket means and segments to engage said plastic sheet; partible female mold segments received in said socket means; means mounting said segments and socket means for relative axial travel; means mounting said segments for radial movement from a closed mated position in which they form a mold cavity for forming an article such as a container to a radially expanded position; means for creating a differential forming pressure on opposite sides of said plastic sheet; cooperating means on said socket means and mold segments for moving said segments to closed position when the socket means and mold segments are moved relatively axially; means for moving said mold assembly means and mold segments relatively axially to permit said segments to spread to a position in which they can release a container formed therein; and means, operated when said mold assembly means is being withdrawn from the plastic sheet, and only after a predetermined withdrawal thereof relative to said mold segments, operable to withdraw said mold segments back into said socket means so that the container formed can pivot said segments to an expanded position in which they clear the container.

4. The combination defined in claim 3 in which said means operable to withdraw said mold segments back into said socket means comprises spring means.

5. A differential pressure forming machine particularly for forming articles such as containers with portions of increased girth intermediate their ends in a thermoplastic, synthetic plastic sheet comprising: female mold assembly means; means for introducing a heated deformable sheet of plastic to said mold assembly means; means for relatively moving one of said introducing means and mold assembly means to bring said mold assembly means into engagement with said sheet; socket means on said mold assembly means; partible female mold segments received in said socket means; means mounting said segment and socket means for relative axial travel; means mounting said segments for radial movement from a closed mated position in which they form a mold cavity for forming an article such as a container to a radially expanded position; means for creating a differential forming pressure on opposite sides of said plastic sheet; cooperating means on said socket means and mold segments for moving said segments to closed position when the socket means and mold segments are moved relatively axially; means for moving said mold assembly means and mold segments relatively axially to permit said segments to spread to a position in which they can release a container formed therein, and generally U-shaped coolant circulating tube means having an inlet length extending along each segment and an outlet length extending in the opposite direction along each segment.

6. A differential pressure forming machine particularly for forming articles such as containers with portions of increased girth intermediate their ends in a thermoplastic synthetic plastic sheet comprising: female mold assembly means; means for introducing a heated deformable sheet of plastic to said mold assembly means; means for relatively moving one of said introducing means and mold assembly means to bring said mold assembly means into engagement with said sheet; socket means on said mold assembly means; partible female mold segments received in said socket means; means mounting said segments and socket means for relative axial travel; means mounting said segments for radial movement from a closed mated position in which they form a mold cavity for forming an article such as a container to a radially expanded position; means for creating a differential forming pressure on opposite sides of said plastic sheet; cooperating means on said socket means and mold segments for moving said segments to closed position when the socket means and mold segments are moved relatively axially; and means for moving said mold assembly means and mold segments relatively axially to permit said segments to spread to a position in which they can release a container formed therein, and generally U-shaped coolant circulating tubes having separate inlet and outlet sections extending through and anchored in openings in each segment.

7. The combination defined in claim 6 wherein said segments when in closed position form a bell-shaped mold and said inlet and outlet sections conform to the shape thereof and are in heat transfer engagement therewith.

8. In a differential pressure article forming machine particularly for forming articles such as containers: female mold assembly means; female mold means incorporated with said female mold assembly means; opposed mold means; means for holding a hot deformable sheet of plastic between said female mold means and opposed mold means; means mounting said female mold assembly means and female mold means for relative axial travel; means for moving said female mold assembly means and female mold means toward and away from said opposed mold means and plastic sheet; means for producing a differential pressure on opposite sides of said plastic sheet and causing a portion of said sheet to be formed to the shape of said female mold means; and means holding said female mold means in engagement with said plastic sheet when the female mold assembly means is withdrawn, following formation of the shape in said female mold means, for a predetermined interval to operate to strip the sheet from the withdrawing female mold assembly means.

9. A differential pressure article forming machine, particularly for forming articles such as containers with portions of increased girth intermediate their ends, in a thermoplastic, synthetic plastic sheet, comprising: female mold assembly means; means for introducing a heated deformable sheet of plastic to said female mold assembly means; means for relatively moving one of said introducing means and female mold assembly means to bring said female mold assembly means into engagement with said sheet; socket means on said female mold assembly means; partible female mold segments received in said socket means; means mounting said segments and socket means for relative axial travel; means also mounting said segments for radial movement from a closed mated position in which they form a mold cavity for forming an article such as a container to a radially expanded position; means for creating a differential forming pressure on opposite sides of said plastic sheet; cooperating means on said socket means and mold segments for moving said segments to closed position when the socket means and mold segments are moved relatively axially; and means for moving said female mold assembly means and mold segments relatively axially to permit said segments to spread to a position in which they can release a container formed therein; each of said segments having radial wall portions permitting them to form a closed end cavity; and means mounting said radial wall portions for pivotal movement; slot and guide means associated with each of said wall portions to permit said segments to swing radially outwardly, said slot and guide means each comprising an axially extending guide movable in a radially extending slot.

10. A differential pressure article forming machine, particularly for forming articles such as containers with portions of increased girth intermediate their ends in a thermoplastic, synthetic plastic sheet, comprising: female mold assembly means; means for introducing a heated deformable sheet of plastic to said female mold assembly means; means for relatively moving one of said introducing means and female mold assembly means to bring said female mold assembly means into engagement with said sheet; socket means on said female mold assembly means; partible female mold segments received in said socket means; means mounting said segments and socket means for relative axial travel; means also mounting said segments for radial movement from a closed mated position in which they form a mold cavity for forming an article such as a container to a radially expanded position; means for creating a differential forming pressure on opposite sides of said plastic sheet; cooperating means on said socket means and mold segments for moving said segments to closed position when the socket means and mold segments are moved relatively axially comprising spaced apart ring means adjacent said segments surrounding each end thereof; means for moving said female mold assembly means and mold segments relatively axially to permit said segments to spread to a position in which they can release a container formed therein; and means for closing said segments after a predetermined further such movement has occurred.

11. A differential pressure forming machine particularly for forming articles such as containers comprising: mold assembly means; means for introducing a hot deformable sheet of plastic to said mold assembly means; partible female mold means comprising a portion of said mold assembly means; means for moving said mold assembly means and partible female mold means to and from said plastic sheet; means for producing a differential pressure on opposite sides of said plastic sheet and causing a portion of said sheet to be formed to the shape of said female mold means; and means holding said partible female mold means in radially closed position when the mold assembly means is in engagement with said plastic sheet and permitting radial expansion thereof when the mold assembly means is withdrawn; and means conditioned by withdrawal of said mold assembly means for moving said partible female mold means back into engagement with said holding means upon further withdrawal of said mold assembly means.

12. In a differential pressure article forming machine, particularly for forming articles such as containers; female mold assembly means; means for introducing a hot deformable sheet of plastic to said female mold assembly means; partible female mold means incorporated with said female mold assembly means; means mounting said female mold assembly means and female mold means for relative axial travel; means for moving said female mold assembly means and female mold means to and from said plastic sheet; means for producing a differential pressure on opposite sides of said plastic sheet and causing a portion of said sheet to be formed to the shape of said female mold means; and means holding said female mold means in engagement with said sheet when the female mold assembly means is withdrawn, a first predetermined increment following formation of the shape in said female mold means, to operate to strip the sheet from the withdrawing female mold assembly means; said holding means comprising means holding said partible mold means in radially closed position when the female mold assembly means is in engagement with said plastic sheet, and permitting radial expansion thereof when the female mold assembly means is withdrawn a second predetermined increment to thereby permit the formed article to be released.

13. A differential pressure forming machine as set forth in claim 12 further comprising: means responsive to movement of said mold assembly means for automatically closing said partible female mold means after said mold means is opened to release said article.

14. A differential pressure forming machine as set forth in claim 12 wherein said means holding said partible female mold means includes pivot means for enabling said female mold means to pivot thereon when said assembly is withdrawn said second increment.

15. A differential pressure forming machine as set forth in claim 14 wherein said female mold means comprises a plurality of partible die segments each having a radial wall portion permitting them collectively to form a closed end cavity, each of said wall portions having first and second radially spaced apart mounting and guide means connecting each of said partible die segments with said pivot means.

16. A differential pressure forming machine particularly for forming articles such as containers comprising: mold assembly means; means for introducing a deformable sheet of plastic to said mold assembly means; partible female mold means comprising a portion of said mold assembly means; means for moving said mold assembly means and partible female mold means to and from said plastic sheet; means for producing a differential pressure on opposite sides of said plastic sheet and causing a portion of said sheet to be formed to the shape of said female mold means; means permitting radial expansion of said female mold means when the mold assembly means is withdrawn; and means conditioned by withdrawal of said mold assembly means moving said partible female mold means back into contracted condition upon further withdrawal of said mold assembly means.

17. A differential pressure article forming a machine for forming an article having a portion of expanded girth inward of one end comprising: female mold assembly means; means for introducing a deformable sheet of plastic to said female mold assembly means; means for moving said female mold assembly means to and from said plastic sheet; partible female mold means pivotally mounted in said female mold assembly means; means mounting said female mold assembly means and partible female mold means for relative axial travel; means for producing a differential pressure on opposite sides of said plastic sheet and causing a portion of said sheet to be formed to the shape of said partible female mold means; said partible female mold means being free for movement to expanded condition upon withdrawal of said article when the female mold assembly means is withdrawn following formation of the article in said female mold means; and means responsive to movement of said female mold assembly means for automatically closing said female mold means when the female mold assembly has been moved away a further predetermined distance.

18. A differential pressure forming machine as set forth in claim 17 wherein said means for automatically closing said mold means includes cooperating means on said mold assembly and said female mold means for moving said female mold means to closed position when the mold assembly and female mold means are moved relatively axially.

19. A differential pressure forming machine as set forth in claim 18 where said means for automatically closing said female mold means includes resilient means for biasing said female mold means against movement relative to said mold assembly means.

20. A differential pressure article forming machine, particularly for forming articles such as containers with portions of increased girth intermediate their ends in a thermoplastic, synthetic plastic sheet, comprising: female mold assembly means; means for introducing a heated deformable sheet of plastic to said female mold assembly means; means for relatively moving one of said introducing means and female mold assembly means to bring said female mold assembly means to said sheet; socket means on said female mold assembly means; partible female mold segments received in said socket means; means mounting said segments and socket means for relative axial travel; means also mounting said segments for radial movement from a closed mated position in which they form a mold cavity for forming an article such as a container to a radially expanded position; means for creating a differential forming pressure on opposite sides of said plastic sheet; cooperating means on said socket means and mold segments for moving said segments to closed position when the socket means and mold segments are moved relatively axially; means for moving said female mold assembly means and mold segments relatively axially to permit said segments to spread to a position in which they can release a container formed therein, said female mold assembly means including a manifold section with a plurality of openings connected with a plurality of said socket means, mold segments being provided in each socket means having radial walls which when in mated engagement in closed position seal said openings; suction line means connected with said manifold section; and suction ports extending through each mold segment communicating with said manifold section.

References Cited
UNITED STATES PATENTS

| | | |
|---|---|---|
| Re. 19,780 | 12/1935 | MacKay et al. |
| 871,963 | 11/1907 | Stewart. |
| 1,776,888 | 9/1930 | Clark. |
| 2,425,004 | 8/1947 | Rabell. |
| 2,513,052 | 6/1950 | Roberts. |
| 2,903,740 | 9/1959 | Parfrey. |
| 3,052,916 | 9/1962 | Campbell. |
| 3,259,942 | 7/1966 | Politis. |
| 3,344,475 | 10/1967 | Gioe. |
| 3,346,923 | 10/1967 | Brown et al. |
| 3,376,607 | 9/1968 | Brown. |
| 2,330,762 | 9/1943 | Tooker. |
| 2,891,283 | 6/1959 | Cramer et al. |
| 2,894,287 | 7/1959 | Zeigle. |
| 2,985,914 | 5/1961 | Miller. |

WILLIAM J. STEPHENSON, Primary Examiner